US005623959A

United States Patent [19]

Granmoe

[11] Patent Number: 5,623,959

[45] Date of Patent: Apr. 29, 1997

[54] HYDRAULIC PRESSURE RELIEF TOOL

[76] Inventor: Kent G. Granmoe, Box 280, Glendive, Mont. 59330

[21] Appl. No.: 479,193

[22] Filed: Jun. 7, 1995

[51] Int. Cl.[6] .............................. F16K 31/50; F16L 37/32

[52] U.S. Cl. ...................... 137/322; 137/614; 137/614.04

[58] Field of Search .................................... 137/321, 322, 137/614, 614.04, 614.05, 614.19; 251/145, 149.6; 81/488

[56] References Cited

U.S. PATENT DOCUMENTS

| | | | |
|---|---|---|---|
| 929,561 | 7/1909 | Cordew | 137/615 |
| 950,263 | 2/1910 | Harpster | 137/614.04 |
| 1,392,231 | 9/1921 | Shimada | 81/15.4 |
| 1,540,782 | 6/1925 | Kramer | 137/322 |
| 1,633,642 | 6/1927 | Kramer | 137/322 |
| 2,235,572 | 3/1941 | Culbertson | 138/89 |
| 2,649,825 | 8/1953 | Fisher | 81/125 |
| 2,751,927 | 6/1956 | Kinney | 137/322 |
| 2,765,806 | 10/1956 | Webster | 137/322 |
| 2,889,849 | 6/1959 | Shohan | 137/322 |
| 2,898,128 | 8/1959 | Shohan | 137/322 |
| 3,443,581 | 5/1959 | Lyell | 137/322 |
| 3,532,110 | 10/1970 | Peterson | 137/322 |
| 3,718,057 | 2/1973 | Berchtold | 81/15.4 |
| 3,730,221 | 5/1973 | Vik | 137/614 |
| 3,752,179 | 8/1973 | Atkins | 137/322 |
| 3,855,882 | 12/1974 | Wittmann | 81/121 |
| 5,054,179 | 10/1991 | Rini | 29/213 |

*Primary Examiner*—George L Walton

*Attorney, Agent, or Firm*—Jacobson, Price, Holman & Stern, PLLC

[57] ABSTRACT

A hydraulic pressure relief tool including a quick coupler component, either male or female, which has been modified by removing the valve and substituting a screw threaded member threaded in the quick coupler component oriented in the same position as the removed valve. This enables the screw threaded member to engage and open the valve in the quick coupler component connected with the hose when the tool is connected thereto to relieve hydraulic pressure in the hose. The screw threaded member is provided with a T-handle for ease of rotation thereof.

9 Claims, 3 Drawing Sheets

HYDRAULIC PRESSURE RELIEF TOOL

BACKGROUND OF THE INVENTION

1. Field of the Invention

The present invention generally relates to an apparatus for relieving hydraulic pressure in a hydraulic hose connected with hydraulically powered equipment in which the hose supplies hydraulic pressure to the equipment from a source of hydraulic pressure or returns hydraulic pressure from the equipment to a hydraulic fluid reservoir. The hydraulic hose is separably connected to a hydraulic source by a quick coupler including a male and female component each of which includes a valve that is open as long as the quick coupler components are connected but will immediately close when the quick coupler components are disconnected thereby trapping hydraulic pressure in the hose. Any entrapped hydraulic pressure within the hose exerts pressure on the valve in the quick coupler component on the hose which makes it quite difficult to reconnect the male and female components of a quick coupler when reconnecting the hose to a hydraulic pressure source.

The tool of this invention includes a quick coupler component, either male or female which has been modified by removing the valve and substituting a screw thread member threadedly engaged in the quick coupler component and oriented in the same position as the removed valve. This enables the screw threaded member to engage and open the valve in the quick coupler component connected with the hose to relieve hydraulic pressure in the hose. The screw threaded member is provided with a T-handle for ease of rotation thereof.

When the end of the screw threaded member opposed to the valve in the quick coupler component on the hose is threaded toward and engages the valve and moves the valve off the seat in the quick coupler component connected to the hose, hydraulic pressure is relieved from the hose. This enables the quick coupler component on the hose to then be easily connected to the quick coupling component on a source of hydraulic pressure since the coupling operation of the quick coupler components does not require that the valve in the quick coupler component on the hose be forced open when coupling the two component of the quick coupler. The tool also includes a small tube or pipe communicated with the interior of the modified quick coupler component to direct the discharge of hydraulic pressure away from a person using the tool or into a receptacle to catch any hydraulic fluid discharged from the hose when relieving the pressure in the hose.

2. Description of the Prior Art

Hydraulically powered equipment is used for various purposes such as on various agricultural equipment, industrial equipment and the like and usually includes a hydraulic ram in the form of a piston and cylinder assembly, a hydraulic motor or the like connected to a source of hydraulic pressure by flexible hoses with control valves being provided for controlling operation of the hydraulically powered equipment. In many installations, such as agricultural implements, the hydraulic hoses are connected to another hose or a tractor mounted hydraulic control valve by a quick coupler which includes a male component and a female component which are quickly and easily connected by merely inserting the male component into the female component with interconnecting latching or detent structure securing the two components in connected, sealed relation. Each of the two components in the quick coupler have a spring biased valve, usually a steel ball valve, engaged with a valve seat when the quick coupler components are disconnected. When the quick coupler components are connected, the valves contact each other and move each other away from the valve seat thereby communicating the hose with another hose or a source of hydraulic pressure such as the tractor mounted hydraulic control valve.

When the agricultural implement is to be disconnected from the tractor, the hydraulic control valve is closed and the quick coupler components disconnected by manually releasing the latch or detent structure with the valves closing when the quick coupler components are separated. However, the steel ball in the quick coupler connected to the hose is pushed against its seat by the pressure within the hose which prevents hydraulic fluid or oil in the hose from draining onto the ground surface or the like. Frequently, the hydraulically powered equipment on the agricultural implement will remain pressurized due to movement of a component of the agriculture equipment in a manner so that the hydraulically powered unit on the agricultural implement will apply force to the hydraulic fluid to maintain relatively high pressure in the hose. Then, when it is desired to recouple the quick coupler component on the hose to a quick coupler component connected to the tractor mounted hydraulic control valve, or to connect it to another hose, it is quite difficult to move the steel ball valve in the quick coupler component on the hose away from the valve seat. Heretofore, pressure has been relieved by taking the hose and the quick coupler unit attached thereto and beating the steel ball against a hard object such as the frame of an agricultural implement. This procedure is time consuming since the steel ball is pushed off its seat for only a very small part of a second thus releasing only a tiny amount of pressurized fluid. Also, each time the steel ball is hit against an object and temporarily opened, a highly pressurized squirt of hydraulic fluid or oil sprays out in all directions which not only deposits hydraulic fluid onto the ground surface but also on agricultural implements and the person trying to relieve pressure in the hose. Efforts have been made to relieve pressure from various pressurized sources. The following U.S. patents relate to coupling devices and devices for relieving pressure.

| | |
|---|---|
| 929,561 | 3,718,057 |
| 950,263 | 3,730,221 |
| 1,392,231 | 3,855,882 |
| 2,235,572 | 5,054,179 |
| 2,649,825 | |

While the above listed patents disclose various types of valve couplings and certain of the patents include tools for relieving pressure, they do not include a quick coupler component, either male or female, mounted on a hydraulic hose such as those connected to a hydraulic ram or other hydraulic motor on an agricultural implement, industrial machine or the like. The prior patents do not disclose a tool to relieve pressure in a hose which has a residual pressure therein when disconnected from a hydraulic pressure source which makes the quick coupler on the hose very hard to couple to another hose or other hydraulic pressure source such as a control valve which normally controls pressure to the hydraulically powered equipment. The tool of this invention is actually a modified quick coupler component from which the valve has been removed and replaced by a screw threaded member oriented in the same location as the valve for engagement with and opening the valve on a quick coupling component on a hose connected to the hydraulically operated equipment. The tool enables the valve to be quickly and easily opened for relieving hydraulic pressure in the hose to enable it to be easily connected to a quick coupler component on another hose or on a control valve connected with a source of hydraulic pressure.

SUMMARY OF THE INVENTION

An object of the present invention is to provide a hydraulic pressure relief tool in the form of a quick coupler component, either male or female, in which the usually provided valve has been removed and replaced by a threaded member in the same location as the valve. This enables the tool to be quickly and easily coupled to a corresponding quick coupler unit on a hose with pressurized hydraulic fluid therein such as that connected to hydraulically powered equipment such as a hydraulic ram, piston and cylinder arrangement or other hydraulic motor on agriculture implements, industrial machines and the like. The hose has a residual hydraulic pressure therein when disconnected from a quick coupler component on another hose or on a source of hydraulic pressure. The threaded member on the tool will engage the valve on the quick coupler component on the hose connected with the hydraulically powered equipment for opening the valve and relieving the hydraulic pressure in the hose to facilitate coupling of the quick coupler component on the hose to a quick coupler component on another hose or a source of hydraulic pressure.

Another object of the invention is to provide a hydraulic pressure relief tool in accordance with the preceding object in which the tool includes a drain tube communicated with the interior of the tool to direct the relieved pressurized fluid away from the person using the tool or into a suitable receptacle for collecting the hydraulic fluid or oil.

A further object of the invention is to provide a hydraulic pressure relief tool in accordance with the preceding objects in which the tool is an exact duplicate of a quick coupler component, either male or female, with the only modification being the removal of the valve and the placement of a screw threaded member in the same position. The screw threaded member extends through a portion of the quick coupler component and includes a T-handle and a drain tube thus enabling the quick coupler forming this tool to be quickly and easily connected to the quick coupler unit on the pressurized hose.

These together with other objects and advantages which will become subsequently apparent reside in the details of construction and operation as more fully hereinafter described and claimed, reference being had to the accompanying drawings forming a part hereof, wherein like numerals refer to like parts throughout.

DISCLOSURE OF THE PREFERRED EMBODIMENTS

Figure 1:
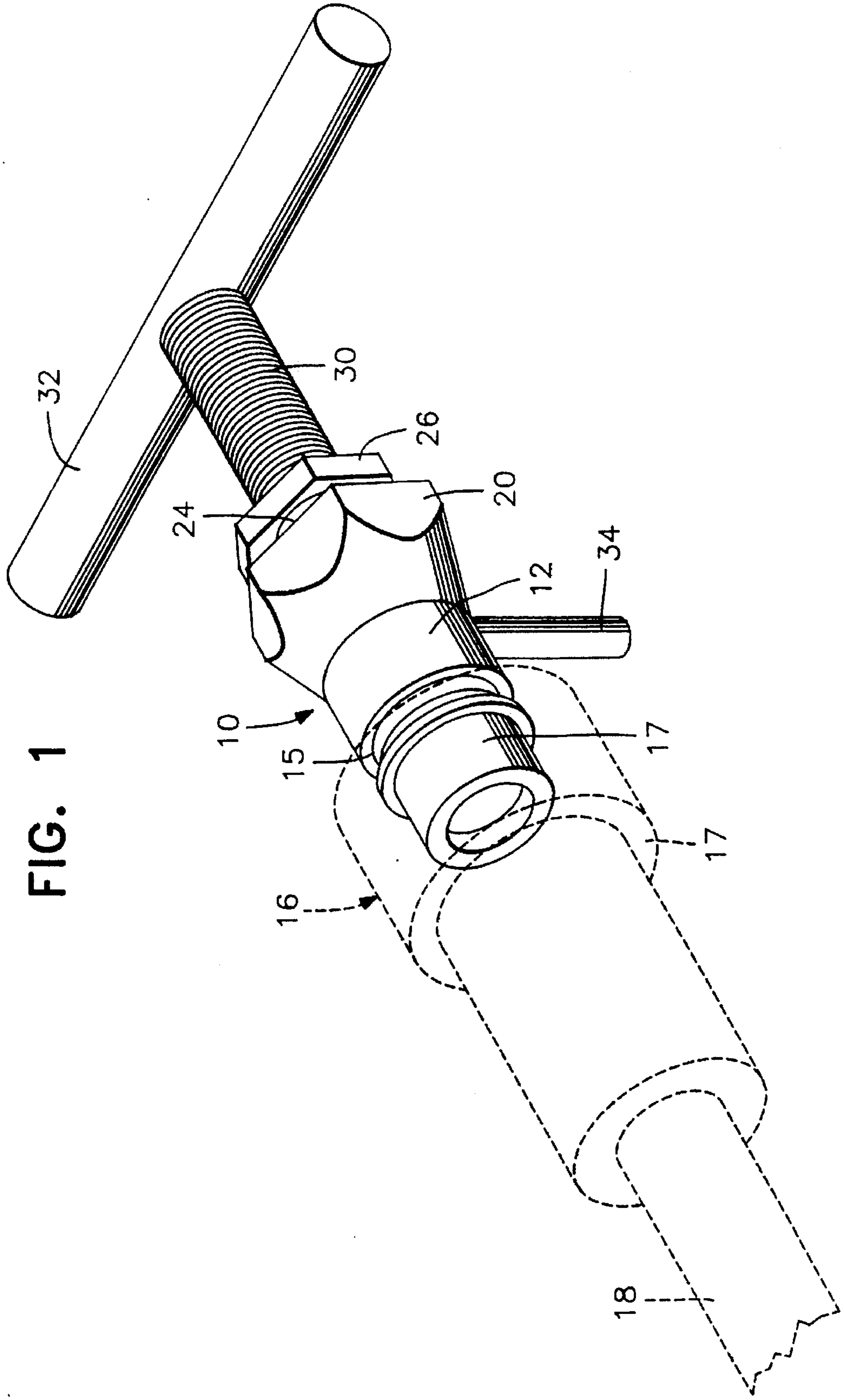
FIG. 1 is a perspective view of the hydraulic pressure relief tool of the present invention illustrating the association of the male type tool associated with a schematically illustrated female quick coupler on a hose with pressurized fluid therein.
Figure 5:
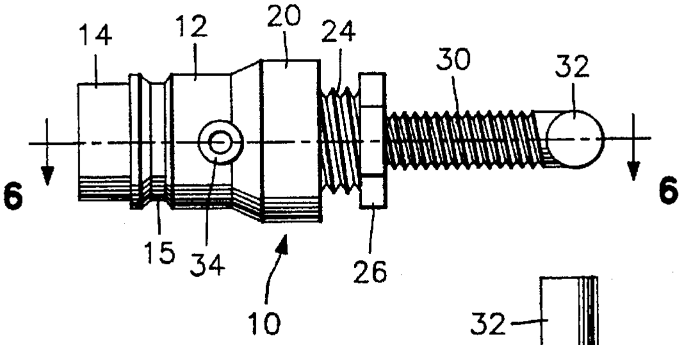
FIG. 5 is a bottom view of the male type tool illustrated in FIG. 1.
Figure 6:
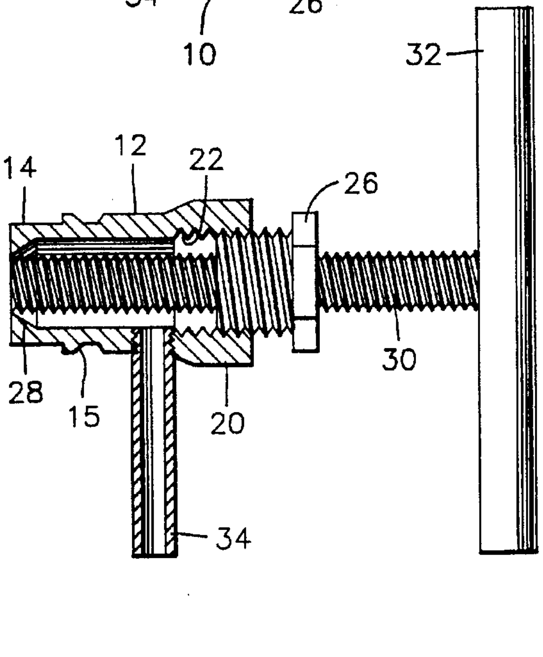
FIG. 6 is a longitudinal, sectional view taken along section line 6—6 on FIG. 5.

Referring specifically to FIGS. 1, 5 and 6 of the drawings, a male type hydraulic pressure relief tool constructed in accordance with the present invention is generally designated by reference numeral 10 which is configured in a manner duplicative of a conventional male quick coupler component and which includes a generally cylindrical hollow body 12 having a tubular axial extension 14 and a peripheral groove 15 which is inserted into and lockingly engaged with a female quick coupler component 16 connected to a hydraulic hose 18. The female quick coupler component 16 and the hydraulic hose 18 is illustrated in broken lines in FIG. 1 with the hose 18 being connected to hydraulically powered equipment such as a hydraulic ram or hydraulic piston and cylinder arrangement on an agricultural implement. The female quick coupler component 16 on the hose 18 is a conventional quick coupler unit which functions in a conventional manner and is generally well known in the art such as that shown in U.S. Pat. No. 3,730,221 in which the male component and female component are latched together by a plurality of detents which are engaged with the peripheral groove 15 and held in place by a spring biased sliding sleeve 17 on the female quick coupler component. Thus, the male quick coupler component form of the tool 10 is connected to the valved female quick coupler component 16 on the pressurized hose in a conventional manner of coupling a quick coupler.

The cylindrical body 12 includes an enlarged end portion 20 which is internally threaded at 22 for receiving an externally threaded adaptor 24 that includes wrench receiving flat surfaces 26 at one end thereof for screwing the adaptor 24 into the threaded end of the enlarged portion 20 of the body 12. The normally provided steel ball valve that engages a seat 28 at the end of the tubular extension 14 which telescopes into the female quick coupler component 16 has been removed along with its associated spring structure. An externally screw threaded member 30 is threaded through the internally threaded adaptor 24 and the inner end thereof is in axial alignment with the valve seat 28 and thus in alignment with and in registry with the ball valve in the female quick coupler component 16 when the tool is assembled onto the quick coupler component 16. The screw threaded member 30 is provided with a T-shaped handle 32 rigid with an outer end thereof in order to enable the screw threaded member 30 to be rotated to move the ball valve in the female quick coupler component 16 on the hose 18 away from its valve seat thereby relieving hydraulic pressure in the hose 18 by permitting flow of pressurized hydraulic fluid between the ball valve and valve seat in the female quick coupler component 16.

The hydraulic pressure relief tool 10 includes a drain tube 34 extending perpendicularly to the body 12 and screw threaded into the body 12 for communication with the hollow interior of the body 12. The drain tube enables pressurized hydraulic fluid to be directed away from the person using the relief tool 10 and can be connected to a tube or the like for discharge into a suitable receptacle to prevent the hydraulic fluid from merely being discharged onto the ground surface.

The structure of the hydraulic pressure relief tool is duplicative of a male quick coupler component with the body of the conventional male quick coupler unit being modified by removing the steel ball valve and its associated structure, mounting a screw threaded member for axial movement through the body of the tool for engaging the inner end of the screw threaded member with the ball valve on the conventional female quick coupler component 16 with the tool also including a drain tube for directing the discharge of hydraulic fluid relieved from the hose 18. After the hydraulic pressure in the hose 18 has been relieved, the tool 10 is disconnected from the quick coupler component 16 by retracting spring biased sleeve 17 in the exact same manner as disconnecting conventional quick coupler male and female components. After the hydraulic pressure has been relieved, the tool is separated from the quick coupler component 16 and the quick coupler component 16 and hose can then be connected to a conventional male quick coupler component without having to force open the valve in the female quick coupler component 16 by overcoming the force exerted on the ball valve in the female quick coupler component 16 by hydraulic pressure in hose 18 since that hydraulic pressure has been relieved.

Figure 2:
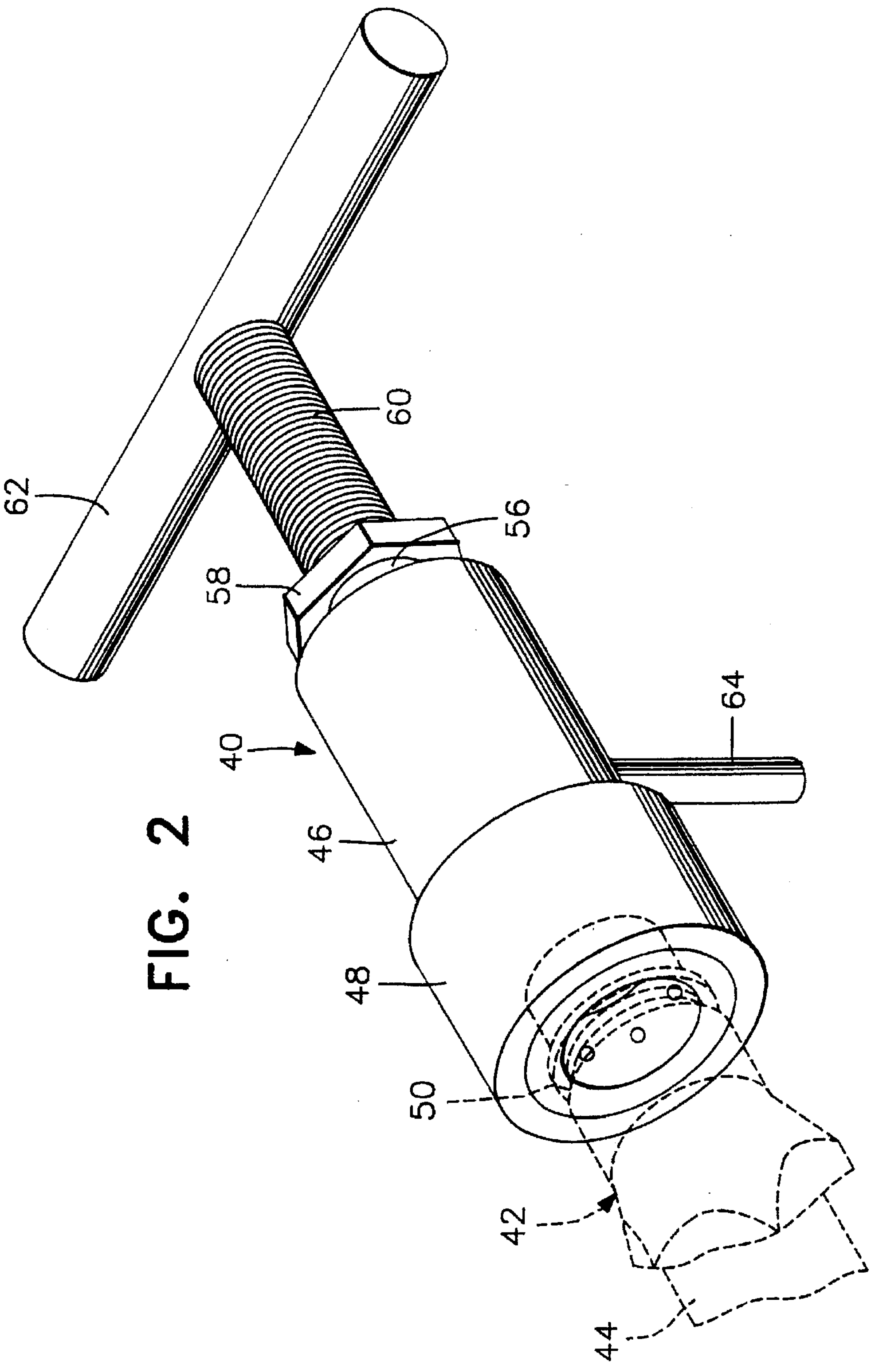
FIG. 2 is a perspective view similar to FIG. 1 but illustrating a female type tool associated with a schematically illustrated male type quick coupler on the pressurized hose.
Figure 3:
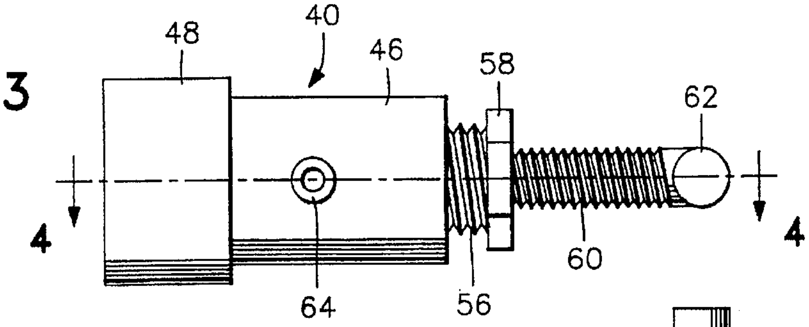
FIG. 3 is a bottom plan view of the female type tool illustrated in FIG. 2.
Figure 4:
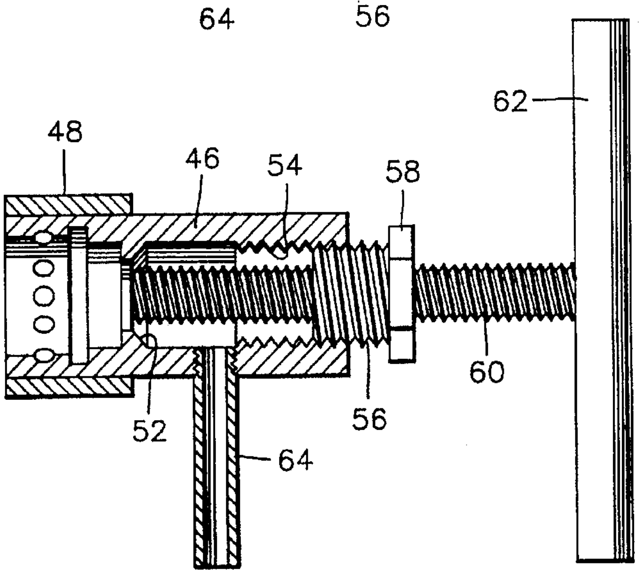
FIG. 4 is a longitudinal, sectional view of the female type tool taken along section line 4—4 on FIG. 3.

FIGS. 2–4 illustrate a female embodiment of the hydraulic pressure relief tool of the present invention generally designated by reference numeral 40 which is associated with and connected to a male quick coupler component 42 connected to a hydraulic hose 44 that is connected with hydraulically powered equipment on an agricultural implement or the like. The female tool 40 is duplicative of a female type quick coupler component and includes a tubular body 46 with a spring biased slidable sleeve 48 and ball detents which engage a groove 50 in the male quick coupler component 42 for detachably securing the quick coupler components together. The cylindrical hollow body 46 is provided with a valve seat 52 which normally is engaged by the steel ball valve and associated closing mechanism which has been removed. The interior of the cylindrical body 46 has an internally threaded end portion 54 receiving an externally threaded adaptor 56. The internally threaded adaptor includes flat portions 58 at one end thereof for engagement by a wrench to insert the adaptor. An elongated externally threaded member 60 is threaded through the adaptor 56 in alignment with and extends to the valve seat for engaging the ball valve in the male quick coupler component 42 for opening the valve when a T-handle 62 on the threaded member is rotated to rotate the member 60 to thread it inwardly into the body 46. Also, the body 46 includes a tube 64 threaded into and communicated with the hollow interior of the body 46 and extending perpendicularly therefrom for directing hydraulic pressure away from a person using the tool or directing hydraulic fluid into a receptacle.

By using the tool of the present invention, a hydraulic hose that has a quick coupler component on the end and which has pressure in it can be easily and quickly connected to the tool. Then by screwing the screw threaded member inwardly, the steel ball in the quick coupler on the hose is pushed away from the valve seat to relieve the hydraulic pressure through the drain tube. The use of this tool will effectively relieve hydraulic pressure which exists in a hydraulic hose when the quick coupler on the hose has been separated from a quick coupler connected with another hose or other hydraulic pressure source. When the quick coupler component on the hose is disconnected, the steel ball valve in the quick coupler on the hose is pushed against its seat so that no hydraulic fluid under pressure is allowed to escape from the hose. When the steel ball in a quick coupler component is pressurized against its seat it is extremely hard to couple it to a quick coupler component on another hose or on a tractor mounted hydraulic control valve. The tool of this invention can be easily coupled to the quick coupler unit on the hose since no pressure has to be used to force the steel ball from its seat. After the tool is coupled to the quick coupler on the hose, the T-handle is turned to move the elongated screw threaded member against the steel ball valve and move it to open position by overcoming the pressure holding the steel ball valve on the valve seat. This moves the ball valve from the valve seat relieving the pressure from the hose so that hydraulic fluid will be released from the hydraulic hose into the tool and out through the drain pipe or tube thereby protecting the user of the tool and enabling the relieved hydraulic fluid or oil to be collected.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A hydraulic pressure relief tool for relieving hydraulic pressure in a hose supplying hydraulic pressure to a pressure operated unit and having a valved quick coupler component thereon which retains residual hydraulic pressure in said hose when the quick coupler component on the hose is separated from another valved quick coupler component connected with a source of hydraulic pressure, said tool comprising a hollow body duplicative of the valved quick coupler component on the hose with the valve removed, said hollow body being coupled to the quick coupler component on the hose, a screw threaded member threadedly mounted in said hollow body with an inner end of the screw threaded member engaging the valve on the quick coupler component on the hose, a handle on said screw threaded member externally of the body to rotate the screw threaded member to move it longitudinally against the valve in the quick coupler component on the hose to move the valve in the quick coupler component on the hose to open position to relieve hydraulic pressure in the hose thereby enabling the quick coupler component on the hose to be connected to a quick coupler component connected to a source of hydraulic pressure without having to open the valve in the quick coupler component on the hose against residual hydraulic pressure in said hose, said body including a drain opening for discharge of hydraulic fluid released from the hose.

2. The tool as defined in claim 1 together with a tube connected to said drain opening and extending laterally from the body for directing discharged hydraulic fluid away from a person using the tool and enabling collection of the hydraulic fluid in a receptacle.

3. The method of releasing hydraulic pressure in a hose communicated with hydraulically powered equipment and provided with a quick coupler component having a spring biased closure valve on the free end thereof for retaining hydraulic pressure in the hose when the hose is disconnected from a source of hydraulic pressure consisting of the steps of connecting a duplicative quick coupler component modified by removing the spring biased closure valve to the quick coupler component on the hose in which the modified quick coupler component has its spring biased closure valve replaced by a longitudinally movable screw threaded member aligned with the valve on the quick coupler component on the hose and screw threading the longitudinally movable member inwardly to engage the valve on the quick coupler on the hose thereby moving the valve to open position to release hydraulic pressure in the hose.

4. The method as defined in claim 1 together with the step of directing the released hydraulic fluid away from a person using the tool and enabling the released hydraulic fluid to be collected.

5. In combination with a pressurized hydraulic hose having valved quick coupler components therein which enables the pressurized hose to be separated into two segments, one of the hose segments being in communication with a source of pressurized hydraulic fluid, the other hose segment being in communication with a hydraulically powered unit, said quick coupler components retaining hydraulic pressure in the hose segments when the quick coupler components on the hose are separated from each other, a tool for relieving hydraulic pressure from said hose segment connected with a hydraulically powered unit, said tool comprising a hollow body duplicative of the valved quick coupler component on the hose segment connected with a source of pressurized hydraulic fluid with the valve removed, a screw threaded member threadedly mounted in said body with an inner end of the screw threaded member being located to engage the valve on the quick coupler component on the hose segment in communication with a hydraulically powered unit when the tool is connected thereto, a handle on said screw threaded member externally of the body to rotate the screw threaded member to move it longitudinally against the valve in the quick coupler component on the hose segment to which the tool is connected to move the valve to open position to relieve hydraulic pressure in that hose segment.

6. The combination as defined in claim 1 wherein said tool body includes a drain opening for discharge of hydraulic fluid released from the hose.

7. The combination as defined in claim 1 together with a tube inserted into said drain opening and extending laterally from the body for directing discharged hydraulic fluid away from a person using the tool and enabling collection of the hydraulic fluid in a receptacle.

8. The combination as defined in claim 7, wherein the valve in the quick coupler components on the hose segments is a metal ball valve spring biased to closed position against a valve seat, said screw threaded member having a diameter less than the valve seat and ball valve for moving the ball valve to open position.

9. The combination as defined in claim 1 wherein said quick coupler on the hose segment in communication with a hydraulically powered unit and said body include coacting, releasable latch means for separably connecting the tool to the quick coupler component on the hose segment.

* * * * *